United States Patent
Oda et al.

(10) Patent No.: US 7,353,792 B2
(45) Date of Patent: Apr. 8, 2008

(54) ENGINE FOR MOTORCYCLE

(75) Inventors: Tomoyuki Oda, Iwata (JP); Hidetoshi Arakawa, Iwata (JP)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 0 days.

(21) Appl. No.: 11/524,285

(22) Filed: Sep. 21, 2006

(65) Prior Publication Data
US 2007/0068296 A1    Mar. 29, 2007

(30) Foreign Application Priority Data
Sep. 25, 2005    (JP) .............................. 2005-307774

(51) Int. Cl.
F02F 7/00    (2006.01)
F16H 57/02    (2006.01)

(52) U.S. Cl. ............................ 123/195 R; 123/195 AC; 74/606 R

(58) Field of Classification Search ............ 123/195 R, 123/195 C, 195 H, 195 AC; 74/606 R
See application file for complete search history.

(56) References Cited

U.S. PATENT DOCUMENTS

| | | | | |
|---|---|---|---|---|
| 3,888,134 A * | 6/1975 | Miranda | ....................... | 74/405 |
| 5,078,105 A * | 1/1992 | Ito et al. | ................. | 123/195 R |
| 5,186,078 A * | 2/1993 | Kameda et al. | ........... | 74/606 R |
| 6,941,918 B2 * | 9/2005 | Laimboeck | ............. | 123/195 R |
| 2005/0085329 A1 * | 4/2005 | Kawakubo et al. | ......... | 475/219 |

* cited by examiner

Primary Examiner—Stephen K. Cronin
Assistant Examiner—Ka Chun Leung
(74) Attorney, Agent, or Firm—Oblon, Spivak, McClelland, Maier & Neustadt, P.C.

(57) ABSTRACT

An engine for a motorcycle includes an engine case split in an upper case section and a lower case section. A mating surface between the upper case section and the lower case section extends linearly and inclines forward downward in a side view of the motorcycle. A crankshaft, a transmission input shaft, and a balancer shaft extending in the width direction of the motorcycle are rotatably supported at the mating surface, and a transmission output shaft rotated by the transmission input shaft is supported in the lower case section. The balancer shaft, the crankshaft, and the transmission input shaft are arranged in that order from the front side in the running direction of the motorcycle. The transmission output shaft is disposed below the transmission input shaft.

3 Claims, 9 Drawing Sheets

ENGINE FOR MOTORCYCLE

BACKGROUND OF THE INVENTION

1. Field of the Invention

The present invention relates to an engine for a motorcycle (motorcycle engine) improving an arrangement of various rotation shafts in an engine case.

2. Related Art

Prior arts provide, for example, Japanese Unexamined Patent Application Publication No. 2002-122028 (patent publication 1) and No. 2004-360773 (patent publication 2), which disclose structures for arranging rotation shafts, such as a crankshaft, a transmission input shaft, a transmission output shaft, and a balancer shaft (i.e., secondary balancer shaft), in an engine case of a motorcycle engine.

In the engine disclosed in the patent publication 1, the engine case is split into three sections, namely, an upper case section, a middle case section, and a lower case section. A crankshaft and a secondary balancer shaft are rotatably supported at a mating or joint surface between the upper case and the middle case, and a transmission input shaft and a transmission output shaft are rotatably supported at a mating surface between the middle case section and the lower case section. The transmission input shaft is disposed behind the crankshaft.

In the engine disclosed in the patent publication 2, the engine case is also split into two sections, namely, an upper case section and a lower case section. A crankshaft and a transmission input shaft are rotatably supported at a mating surface between the upper case section and the lower case section, and a transmission output shaft and a secondary balancer shaft are rotatably supported in the lower case section.

However, in the engine disclosed in the patent publication 1, two rotation shafts are disposed at each of the two mating surfaces between the upper case section and the middle case section and between the middle case section and the lower case section, and these four rotation shafts are arranged in the front-rear direction of the engine case. Therefore, the engine case becomes lengthened in the front-rear direction (longitudinal direction of the motorcycle), and the total size of the engine is thereby increased. Moreover, since the engine case has a three-splittable structure, the workability thereof and mountability of the rotation shafts are not good.

In the engine disclosed in the patent publication 2, the transmission output shaft and the secondary balancer shaft are disposed on the front and rear sides of the crankshaft and the transmission input shaft that are rotatably supported at the mating surface between the upper case section and the lower case section, that is, these four rotation shafts are arranged in the front-rear direction of the engine. This increases the total size of the engine as likely in the above-described engine.

SUMMARY OF THE INVENTION

The present invention was conceived in consideration of the circumstances mentioned above, and an object of the invention is to provide an engine for a motorcycle having a compact structure capable of improving and enhancing the workability of an engine case and the assembling efficiency thereof.

This and other objects can be achieved according to the present invention by providing an engine for a motorcycle, comprising:

an engine case split into an upper case section and a lower case section, which are mated at a mating surface extending linearly therebetween;

a crankshaft, a transmission input shaft and a balancer shaft which extend in a width direction of the motorcycle and supported at the mating surface between the upper case section and the lower case section; and a transmission output shaft supported in the lower case section to be rotatable by the transmission input shaft.

In a preferred embodiment of the above aspect, it may be desired that the mating surface inclines forward downward in the side view of the motorcycle, and the balancer shaft, the crankshaft, and the transmission input shaft are arranged in the described order from a front side in the running direction of the motorcycle.

The transmission output shaft may be disposed below the transmission input shaft. The transmission output shaft may be disposed behind the crankshaft. The transmission output shaft may be disposed between the transmission input shaft and a water pump in the side view of the motorcycle, and the transmission input shaft, the transmission output shaft and the water pump are arranged in the described order from an upper side in the vertical direction.

It is desirable that the lower case section has one side wall portion to which a circular transmission-output-shaft insertion opening is formed through which the transmission output shaft is inserted into the engine case, the transmission-output-shaft insertion opening has an inner diameter set to be larger than an outer diameter of the largest one of transmission driven gears mounted on the transmission output shaft, an eccentric bearing holder is mounted in the transmission-output-shaft insertion opening in a detachable manner from the outside of the engine case, the eccentric bearing holder holding a bearing which rotatably supports one end of the transmission output shaft, and an axis of the transmission output shaft deviates from a center of the eccentric bearing holder toward the transmission input shaft.

According to the present invention of the characters mentioned above, the transmission output shaft can be disposed below the other rotation shafts. This can reduce the longitudinal (front-rear direction) length of the engine case and also reduce the total size of the engine. Since a single mating surface is provided in the engine case, the workability of the engine case and mountability of the rotation shafts can be enhanced.

In addition, it is possible to reduce the space occupied by the rotation shafts in the front-rear direction, to effectively utilize the spaces on the front and rear sides of the crankshaft, and to mainly reduce the front-rear size of the engine case.

The transmission output shaft can be placed close to the crankshaft. This can enhance the space occupation efficiency inside the engine case and can reduce the front-rear size of the engine case.

Furthermore, according to the present invention, it is possible to reduce the center distance between the transmission input shaft and the transmission output shaft, and the size of the engine case. It is also possible to smoothly insert the transmission output shaft in the engine case so that the transmission driven gears mounted on the transmission output shaft do not interfere with a transmission driving gear mounted on the transmission input shaft. Accordingly, the mountability of the transmission output shaft can be enhanced.

It is further to be noted that the nature and further characteristic features of the present invention will be described more clearly in the following descriptions made with reference to the accompanying drawings.

DESCRIPTION OF THE PREFERRED EMBODIMENTS

An embodiment of the present invention will be described hereunder with reference to the accompanying drawings. Further, it is to be noted that terms "upper", "lower", "right", "left" and the like terms are used herein with reference to the illustration of the drawings or in a general standing state of the motorcycle to which the engine is mounted.

Figure 1:
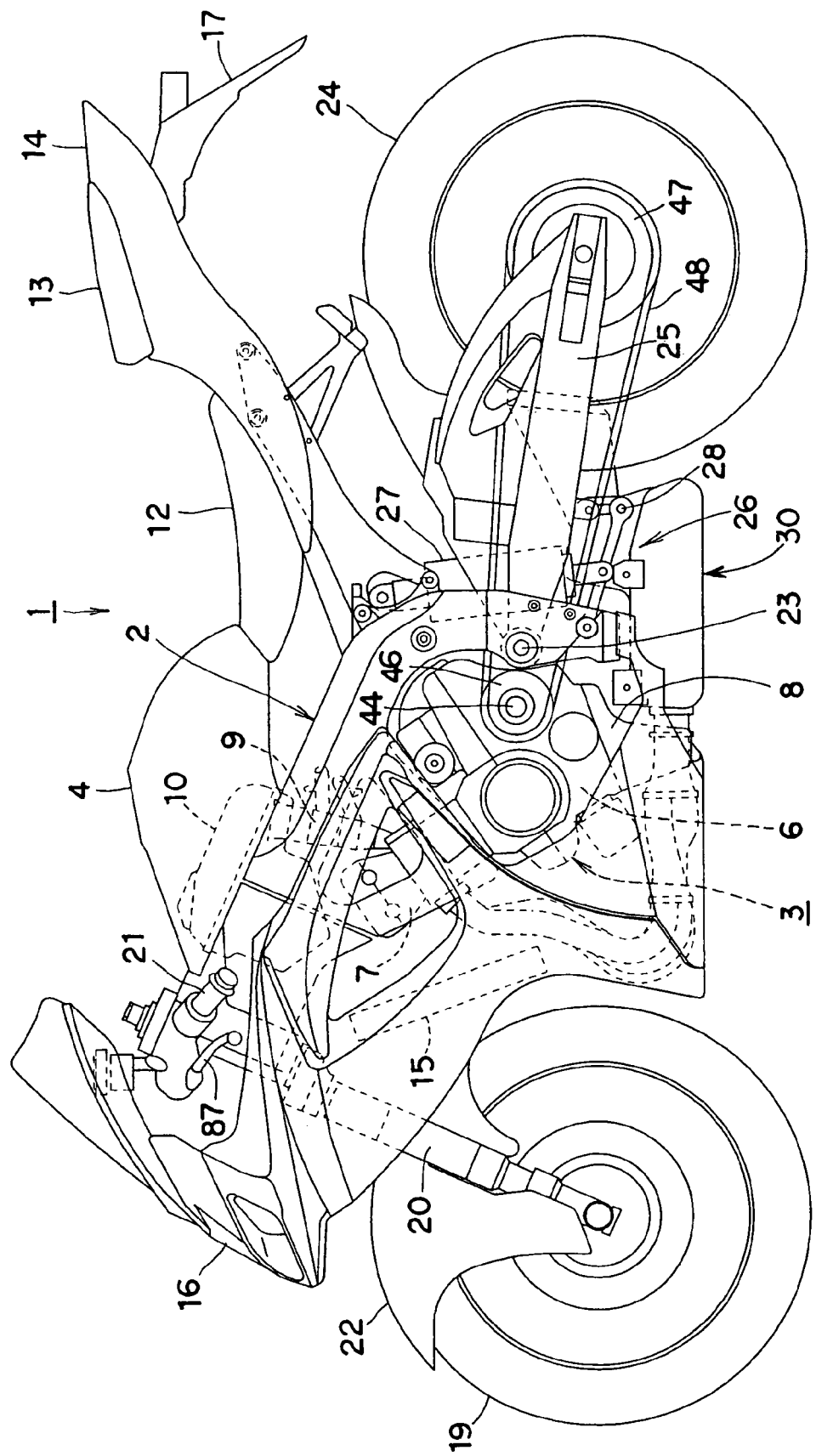
FIG. 1 is a left side view of a motorcycle in which an engine according to the present invention is mounted.
Figure 2:
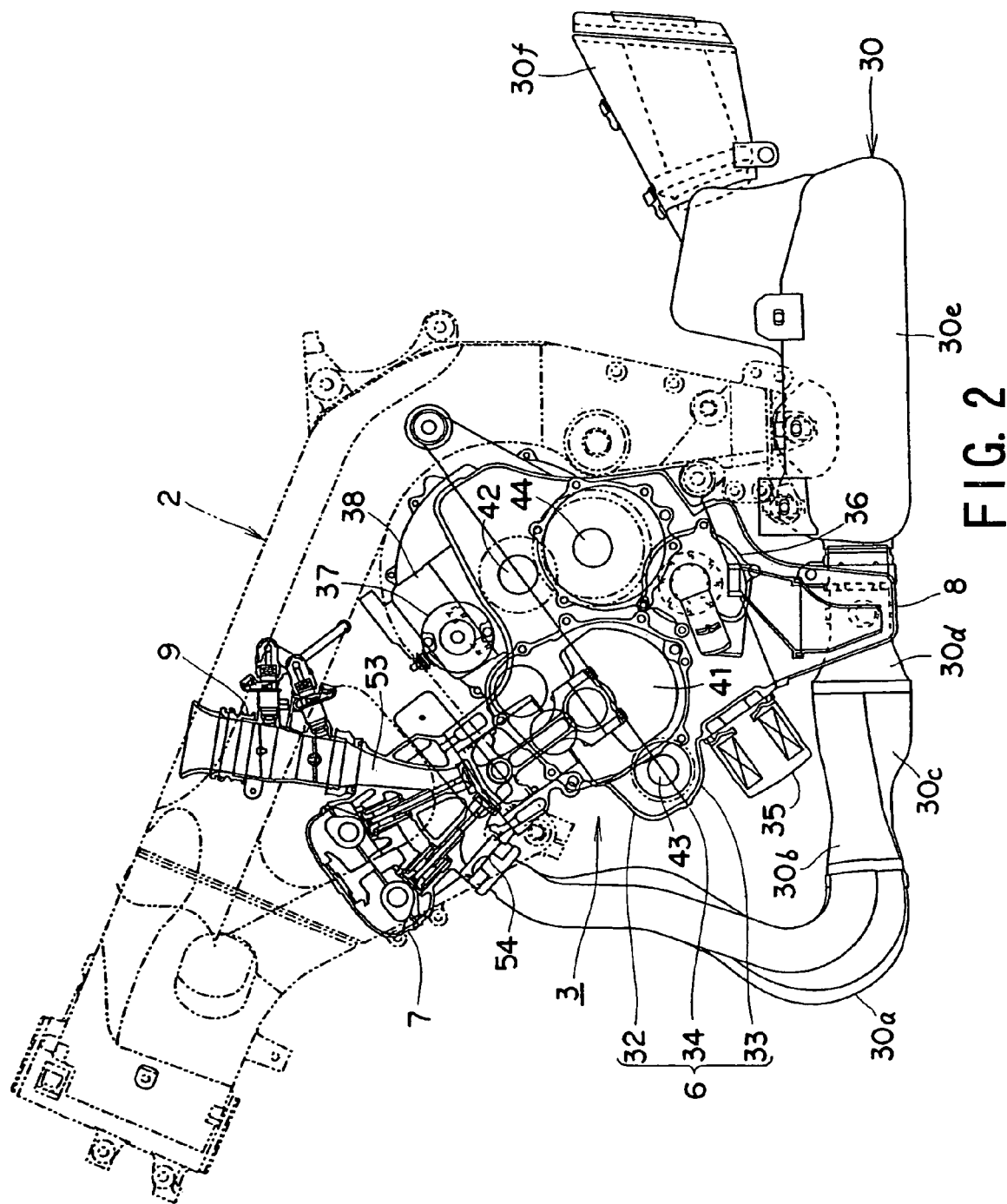
FIG. 2 is an enlarged left side view showing a front half portion of a body frame, the engine, and an exhaust system of the engine.

With reference to FIGS. 1 and 2 showing the embodiment of the present invention, a motorcycle 1 includes a body frame 2 made of, for example, aluminum. A water-cooled four-cycle engine 3 including four cylinders arranged in parallel is suspended from the front half portion of the body frame 2, and a fuel tank 4 is mounted on the body frame 2 above the engine 3.

In the engine 3, a cylinder assembly 7 is disposed on the upper front side of an engine case 6, and an oil pan 8 is disposed on the lower side of the engine case 6. A fuel injector (throttle body) 9 is connected to the rear portion of the cylinder assembly 7, and an air cleaner 10 disposed in a recess formed in the lower surface of the fuel tank 4 is connected to the fuel injector 9.

A rider's seat 12 and a passenger's seat 13 are disposed along with a rear cowling 14 behind the fuel tank 4, and a radiator 15 is provided in front of the cylinder assembly 7 of the engine 3. The front half portion of the body of the motorcycle 1 is covered with a streamlined front cowling 16 made of resin. A rear fender 17 is attached to the rear portion of the rear cowling 14.

A front fork 20 for supporting a front wheel 19 is supported at the front of the body frame 2 so as to be steered in the right-left (width) direction along with a steering lever 21 and a front fender 22. A swing arm 25 for supporting a rear wheel 24 is supported by a pivot shaft 23 extending in the width direction of the motorcycle 1 in the lower middle portion of the body frame 2, that is, directly behind the engine 3, so that the swing arm 25 can be pivoted up and down. A rear-wheel suspension 26 including a cushion unit 27 is provided at a base end of the swing arm 25 and behind the engine 3. The cushion unit 27 is connected at an upper end to the-body frame 2 and at a lower end to the swing arm 25 via a link 28 and so on.

An exhaust system 30 is provided in the engine 3. As shown in FIG. 2, the exhaust system 30 includes a number of first exhaust pipes 30a corresponding to the number of cylinders in the engine 3 (four in this embodiment), a first collecting portion 30b, a second collecting portion 30c, a second exhaust pipe 30d, an expansion chamber body 30e, and a silencer 30f.

Figure 3:
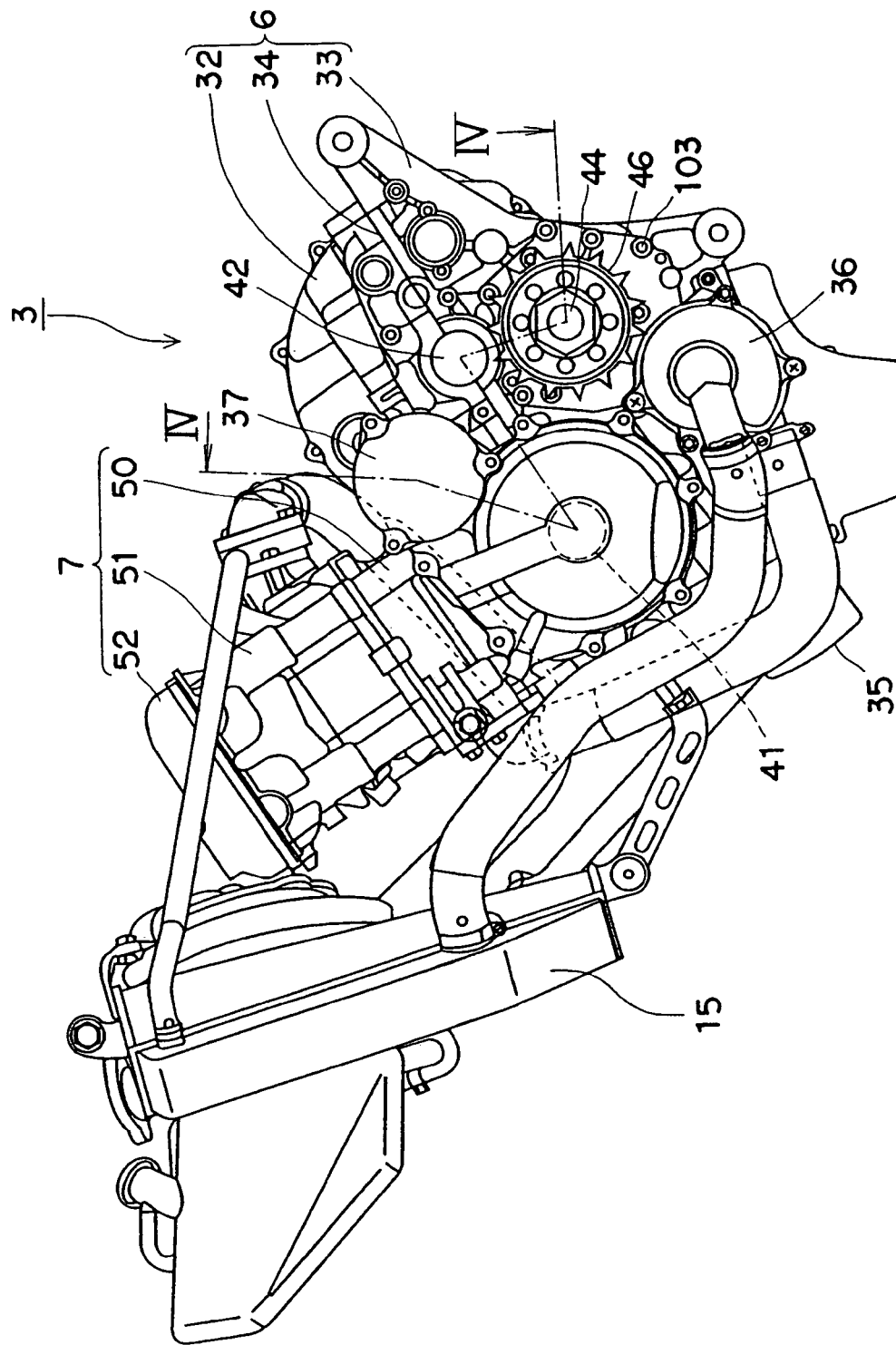
FIG. 3 is an enlarged left side view of the engine and its surrounding portions.

Next, as shown in FIGS. 2 and 3, the engine case 6 has a two-split structure including an upper case section 32 and a lower case section 33. A mating surface 34 between the upper case section 32 and the lower case section 33 extends linearly (that is, as a single flat surface) and inclines forward downwardly in a side view of the motorcycle. An oil filter 35 is disposed on a front surface of the engine case 6, a water pump 36 is disposed on a left side surface, and a starter motor 37 and a breather case 38 are provided on a rear surface thereof.

A crankshaft 41, a transmission input shaft 42, and a balancer shaft (i.e., secondary balancer shaft having a secondary balancer weight rotated in an integrated manner with the secondary balancer shaft which eliminates the secondary vibration arising from a piston reciprocating motion in the engine) 43 extending in the width direction of the motorcycle 1 are rotatably supported at the mating surface 34 in the engine case 6, and a transmission output shaft 44 is rotatably supported in the lower case section 33. The secondary balancer shaft 43, the crankshaft 41, and the transmission input shaft 42 are arranged in the described order from the front side in the running direction of the motorcycle 1. The transmission output shaft 44 is disposed below the transmission input shaft 42. The transmission output shaft 44 is provided with a driving sprocket 46, shown in FIGS. 1, 4, and 5, and a drive chain 48 is wound around the driving sprocket 46 and a driven sprocket 47 mounted in the rear wheel 24.

The cylinder assembly 7 is mounted on the upper front side of the upper case section 32 at an angle of 90° with respect to the mating surface 34 so as to incline forward downward and to tilt forward in the side view of the motorcycle. The cylinder assembly 7 includes a cylinder block 50 provided integrally with the upper case section 32, a cylinder head 51, and a head cover 52. The fuel injector 9 is connected to an intake port 53 provided in a rear surface of the cylinder head 51, and the exhaust system 30 is connected to an exhaust port 54 formed in a front surface of the cylinder head 51, as shown in FIG. 2.

Figure 4:
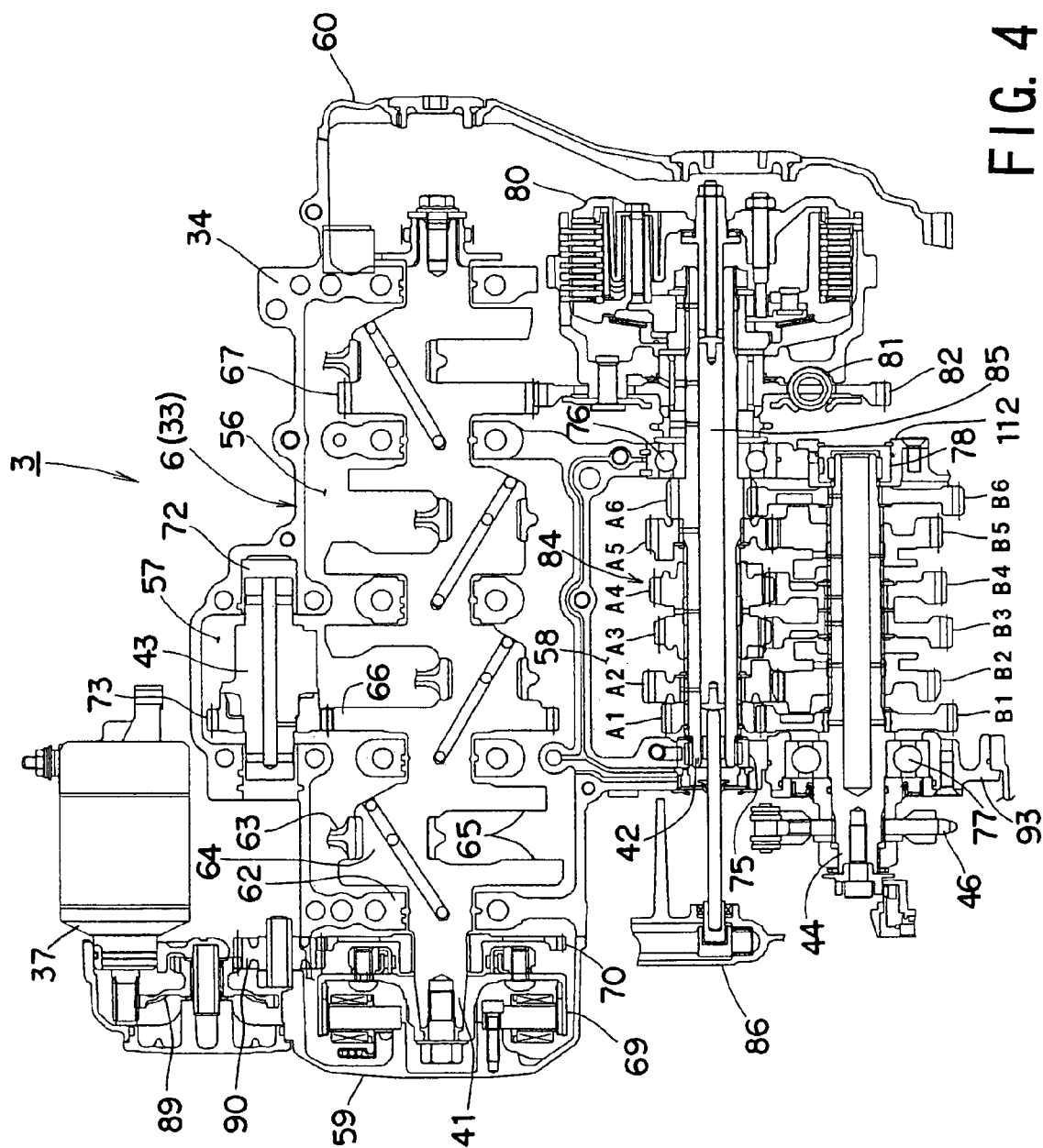
FIG. 4 is a developed view of an engine case, taken along line IV-IV in FIG. 3.

FIG. 4 is a developed view of the engine case 6, taken along the line IV-IV in FIG. 3. A crank chamber 56 is defined in the front half portion of the engine case 6. On the front and rear sides of the crank chamber 56, a balancer shaft chamber 57 and a mission (transmission) chamber 58 are defined, respectively. A left side surface of the crank chamber 56 is covered with a magneto cover 59, and a right side surface of the engine case 6 is entirely covered with a clutch cover 60.

The crankshaft 41 is rotatably supported by five metal bearings 62 provided in the crank chamber 56. Crank pins 64 and crank webs 65 to which four connecting rods 63 are connected are disposed integrally together. A balancer driving gear 66 and a primary driving gear 67 are respectively cut on the outer peripheries of the third crank web 65 from the left side and the second crank web 65 from the right side. A flywheel magneto 69 and a starter driven gear 70 are disposed at the left end of the crankshaft 41.

The secondary balancer shaft 43 is rotatably supported by a metal bearing 72 in the balancer shaft chamber 57. A balancer driven gear 73 corotatably attached to the secondary balancer shaft 43 is meshed with the balancer driving gear 66 of the crankshaft 41. The gear ratio of the balancer driving gear 66 and the balancer driven gear 73 is set at 2:1. Thus, the secondary balancer shaft 43 is rotated at a rotating speed double that of the crankshaft 41, and serves to cancel secondary vibration of the engine 3.

The transmission input shaft 42 and the transmission output shaft 44 are rotatably supported, respectively, by roller bearings 75 and 78 and ball bearings 76 and 77 in the mission chamber 58. A clutch unit 80 is mounted on the right end of the transmission input shaft 42. A large-diameter primary driven gear 82 having a buffer damper 81 is corotatably disposed inside the clutch unit 80. The primary driven gear 82 is meshed with the primary driving gear 67 of the crankshaft 41. Since the number of teeth of the primary driven gear 82 is larger than that of the primary driving gear 67, the clutch unit 80 is rotated by the crankshaft 41 at a reduced speed.

Six transmission driving gears A1 to A6 are mounted on the transmission input shaft 42, and six transmission driven gears B1 to B6 are mounted on the transmission output shaft 44. The transmission driving gears A1 to A6 and the transmission driven gears B1 to B6 are always meshed with each other, thereby constituting a transmission 84. By selecting an arbitrary gear ratio of the transmission driving gears A1 to A6 and the transmission driven gears B1 to B6, the transmission output shaft 44 is rotated by the transmission input shaft 42 at a speed corresponding to the gear ratio.

The transmission input shaft 42 has a hollow structure. A clutch release rod 85 is inserted into the central hollow portion of the transmission input shaft 42 from the left side. A clutch release mechanism 86 for pushing the clutch release rod 85 is disposed on the left side of the engine case 6. The clutch unit 80 and the primary driven gear 82 rotate normally integrally with the transmission input shaft 42 so as to transmit the rotation of the crankshaft 41 to the transmission input shaft 42.

When a clutch lever 87 mounted in the steering lever 21 of the motorcycle 1 is gripped, the clutch release mechanism 86 pushes the clutch release rod 85 to the right in the axial direction, and clutch connection of the clutch unit 80 is thereby released. Consequently, the clutch unit 80 and the primary driven gear 82 can rotate independently of the transmission input shaft 42.

The rotation of the crankshaft 41 is sequentially transmitted to the rear wheel 24 via the primary driving gear 67, the primary driven gear 82, the clutch unit 80, the transmission input shaft 42, the transmission driving gears A1 to A6, the transmission driven gears B1 to B6, the transmission output shaft 44, the driving sprocket 46, the drive chain 48, and the driven sprocket 47 in the described order.

During a speed-changing operation of the transmission 84, the clutch connection of the clutch unit 80 is released to make the speed-changing operation smooth. The driving force of the starter motor 37 is transmitted to the starter driven gear 79 after being reduced via a starter reduction gear 89 and a starter idle gear 90.

Figure 5:
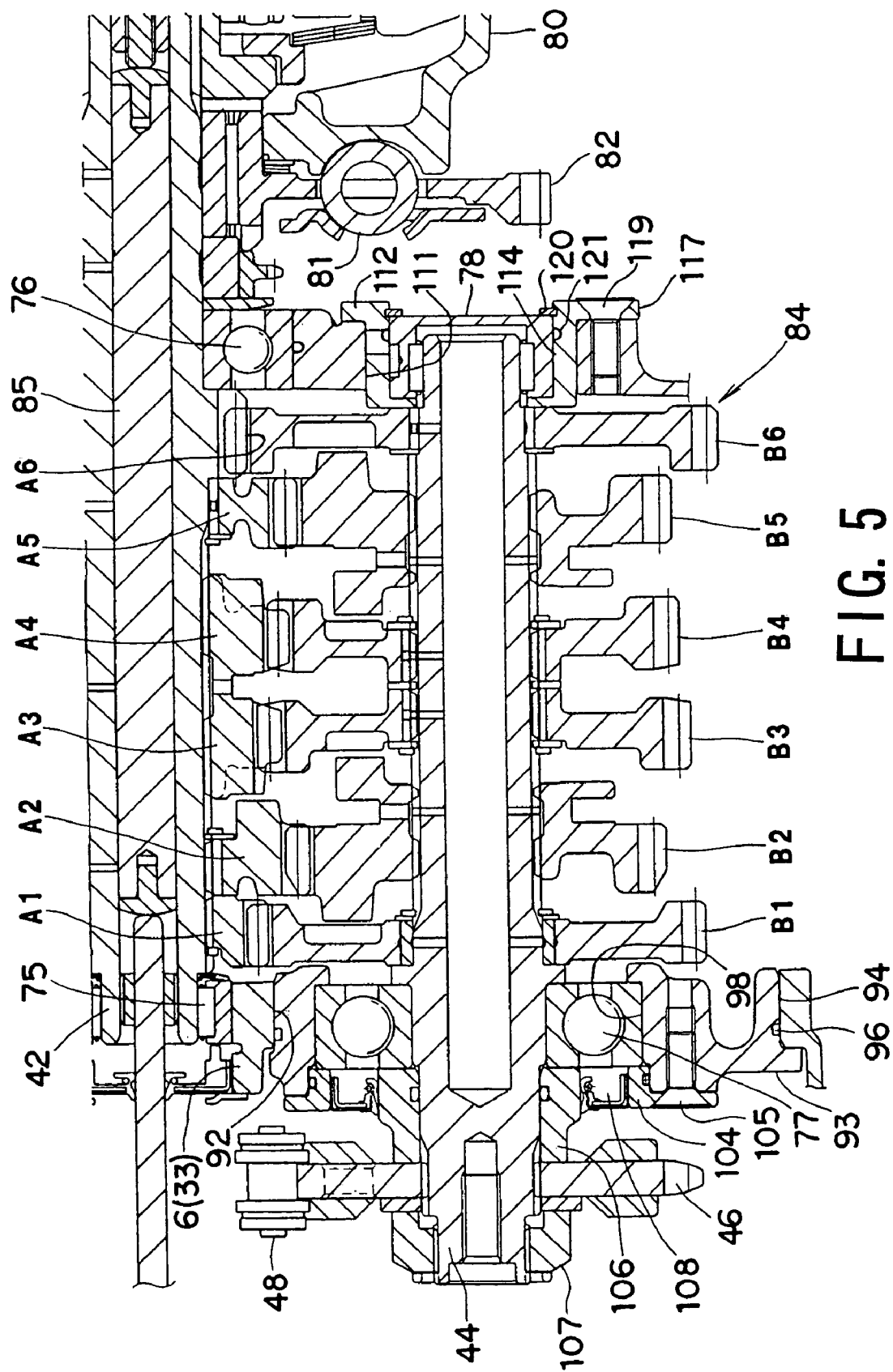
FIG. 5 is an enlarged cross-sectional view showing a transmission output shaft and its surrounding portions.
Figure 6:
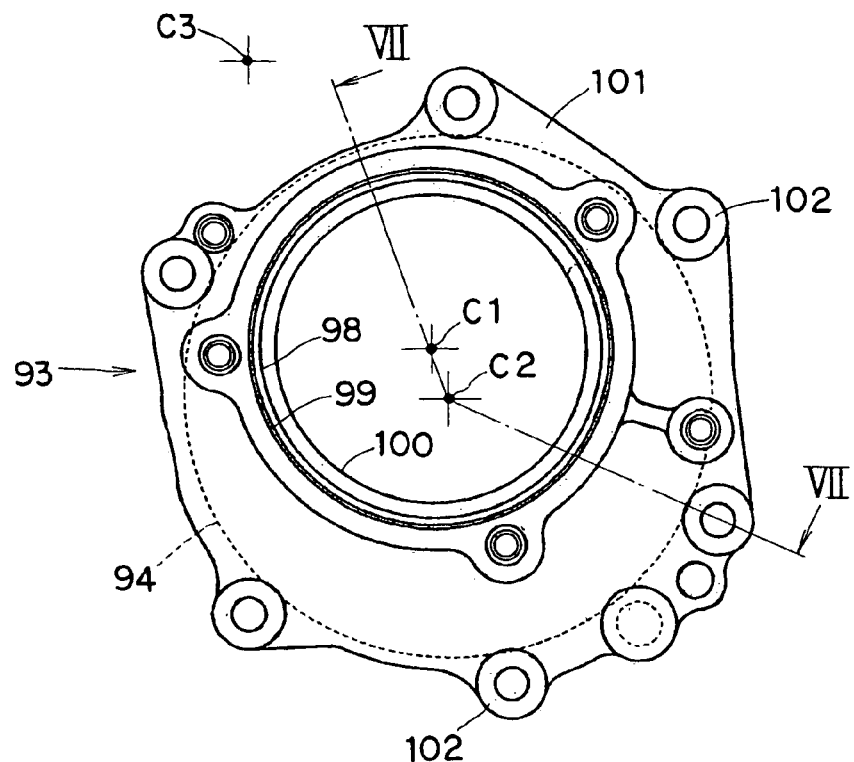
FIG. 6 is a left side view of an eccentric bearing holder.
Figure 7:
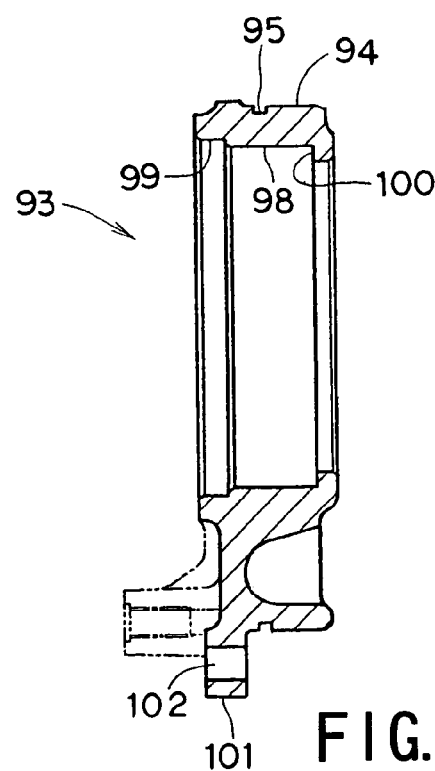
FIG. 7 is a longitudinal sectional view of the eccentric bearing holder, taken along line VII-VII in FIG. 6.

As shown in FIG. 5 on an enlarged scale, a perfectly circular transmission-output-shaft insertion opening 92 is formed, for example, in a left side wall portion of the lower case section 33 of the engine case 6. The inner diameter of the transmission-output-shaft insertion opening 92 is set to be larger than the outer diameter of the transmission driven gear B6 that is the largest one of the transmission driven gears fitted to the transmission output shaft 44. An eccentric bearing holder 93 also shown in FIGS. 6 and 7 is fitted in the transmission-output-shaft insertion opening 92 from the outside of the engine case 6 in a fluid-tight manner to be detachably, so that the transmission-output-shaft insertion opening 92 is closed.

The eccentric bearing holder 93 includes an outer fitting portion 94 shaped like a short cylinder, and the outer fitting portion 94 is cylindrically fitted in the transmission-output-shaft insertion opening 92. The outer fitting portion 94 has an outer diameter so as to be tightly fitted in the transmission-output-shaft insertion opening 92.

An O-ring 96 is fitted in a groove 95 formed in an outer peripheral surface of the outer fitting portion 94 so as to provide a fluid-tight sealing between the outer fitting portion 94 and the transmission-output-shaft insertion opening 92. The interior of the eccentric bearing holder 93 is shaped like a stepped hole including a bearing fitting portion 98, a retainer fitting portion 99, and a bearing fixing flange 100.

A fastening flange 101 having six bolt insertion holes 102 is disposed on the outer periphery of the eccentric bearing holder 93. The eccentric bearing holder 93 is fastened to the lower case section 33 by means of six bolts 103, as shown in FIG. 3.

As shown in FIG. 5, the ball bearing 77 for rotatably supporting the left end of the transmission output shaft 44 is inserted and tightly held in the bearing fitting portion 98 of the eccentric bearing holder 93. The ball bearing 77 is prevented from falling off by an annular bearing retainer 104 fastened to the eccentric bearing holder 93 by means of three screws 105.

The driving sprocket 46 is rotatably mounted, through a spacer 106, to the left end of the transmission output shaft 44 that protrudes leftward from the ball bearing 77, and is fixed by a lock nut 107. An oil seal 108 is interposed between the spacer 106 and the bearing retainer 104.

As shown in FIG. 6, the axis of the transmission output shaft 44 in the eccentric bearing holder 93, that is, the center C1 of the bearing fitting portion 98, deviates from the center of the eccentric bearing holder 93 itself, that is, the center C2 of the outer fitting portion 94 toward the axis C3 of the transmission input shaft 42, by approximately several millimeters to several tens of millimeters.

Figure 8:
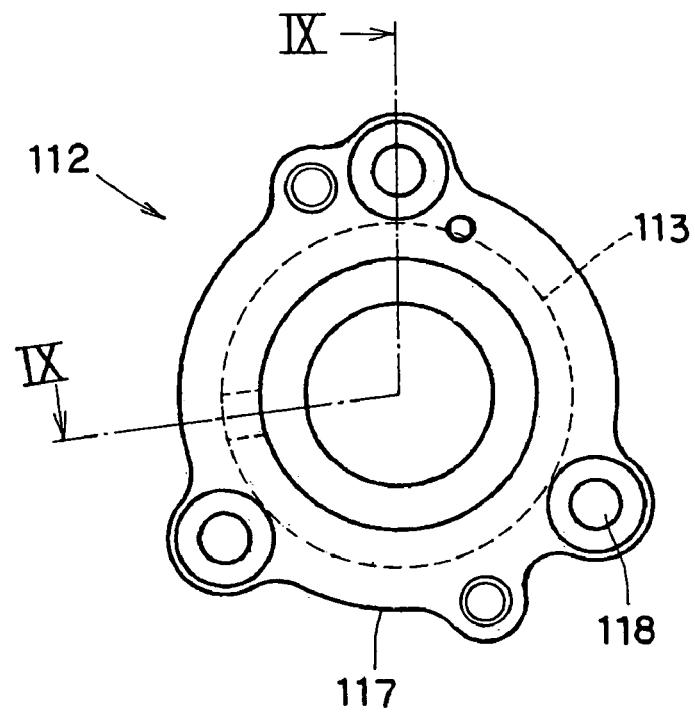
FIG. 8 is a right side view of a bearing holder.
Figure 9:
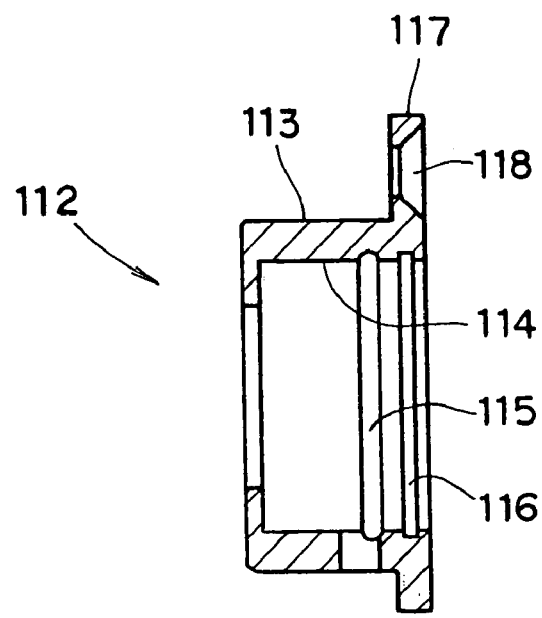
FIG. 9 is a longitudinal sectional view of the bearing holder, taken along line IX-IX in FIG. 8.

A bearing opening 111 shaped like a perfect circle is formed in a right side wall of the lower case section 33. The inner diameter of the bearing opening 111 is markedly smaller than the inner diameter of the transmission-output-shaft insertion opening 92. A bearing holder 112, which is also shown in FIGS. 8 and 9, is detachably fitted in the bearing opening 111 from the outside of the engine case 6 in a fluid-tight manner. The bearing holder 112 has an outer fitting portion 113 shaped like a short cylinder, and the outer fitting portion 113 is cylindrically fitted in the bearing opening 111. The outer fitting portion 113 has an outer diameter so as to be tightly fitted in the bearing opening 111.

The interior of the bearing holder 112 serves as a bearing fitting portion 114, and grooves 115 and 116 are cut on an inner peripheral surface of the bearing fitting portion 114.

The outer fitting portion 113 and the bearing fitting portion 114 are worked so as to be concentric with each other. A fastening flange 117 is disposed to the outer periphery of the bearing holder 112 and has three screw holes 118. The bearing holder 112 is fastened to the lower case section 33 by means of three screws 119, as shown in FIG. 5.

The roller bearing 78 for rotatably supporting the right end of the transmission output shaft 44 is fitted and tightly held in the bearing fitting portion 114 of the bearing holder 112, and a circlip 120 is fitted in the groove 116 from the outer side, thereby preventing the roller bearing 78 from falling off.

Since the outer fitting portion 113 and the bearing fitting portion 114 are concentrically arranged, the center of the bearing fitting portion 114, that is, the axes of the roller bearing 78 and the transmission output shaft 44 coincide with the center of the bearing holder 112. An O-ring 121 fitted in the groove 115 provides a fluid tight sealing between the bearing fitting portion 114 and the roller bearing 78.

Figure 10:
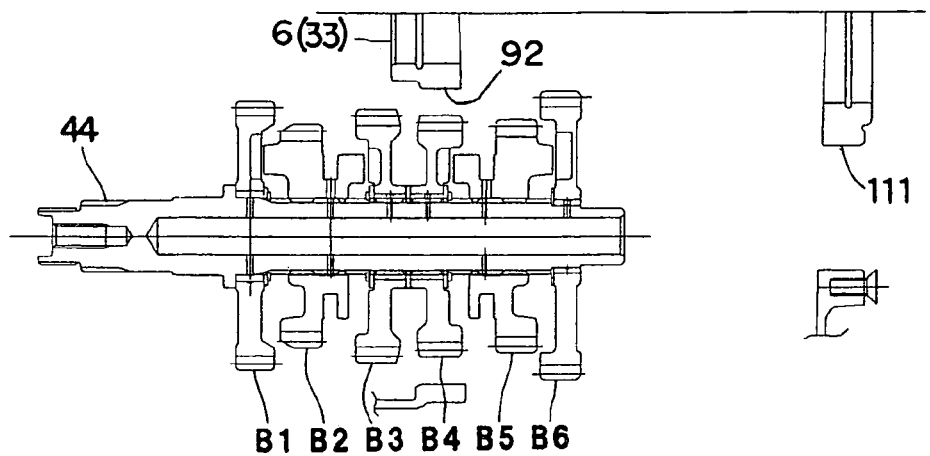
FIG. 10 is an explanatory view showing a procedure of mounting the transmission output shaft in the engine case.
Figure 11:
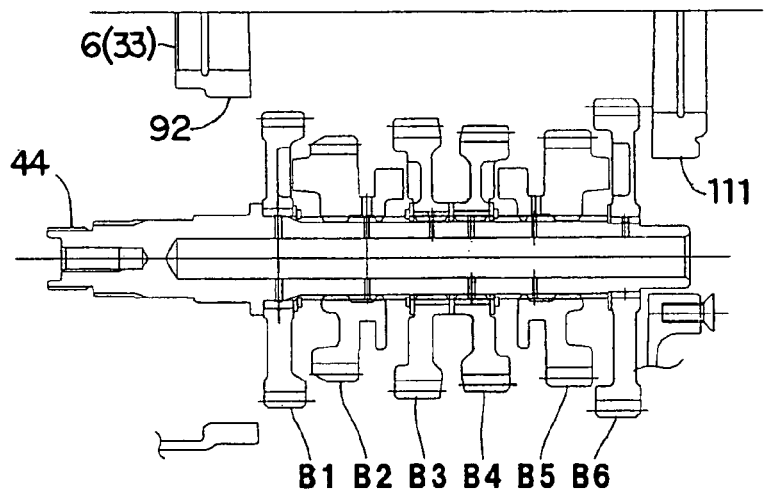
FIG. 11 is an explanatory view showing the procedure of mounting the transmission output shaft in the engine case.
Figure 12:
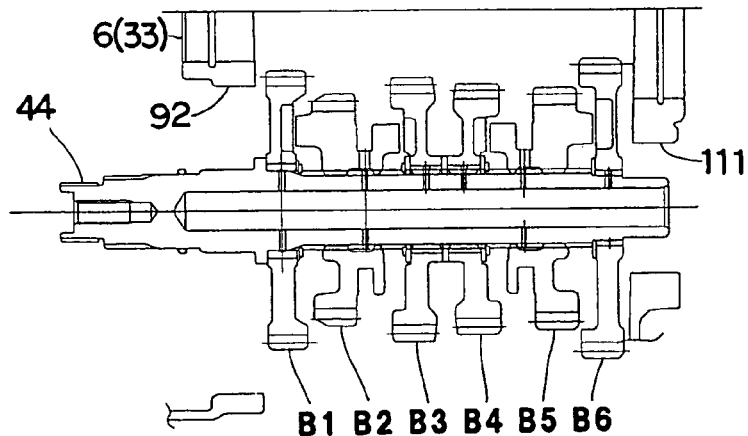
FIG. 12 is an explanatory view showing the procedure of mounting the transmission output shaft in the engine case.

FIGS. 10 to 14 show a procedure of mounting the transmission output shaft 44 in the engine case 6 (i.e., lower case section 33). First, the transmission output shaft 44 having the transmission driven gears B1 to B6 is inserted into the engine case 6 through the transmission-output-shaft insertion opening 92 (FIG. 10). Since the inner diameter of the transmission-output-shaft insertion opening 92 is larger than the outer diameter of the largest transmission driven gear B6, the transmission output shaft 44 and the transmission driven gears B1 to B6 can be easily inserted in the engine case 6. During this insertion, the transmission output shaft 44 is held in a position such that the transmission driven gears B1 to B6 do not interfere with the transmission driving gears A1 to A6 of the transmission input shaft 42, and the right end of the transmission output shaft 44 is eccentrically fitted in the bearing opening 111 (FIG. 11).

Figure 13:
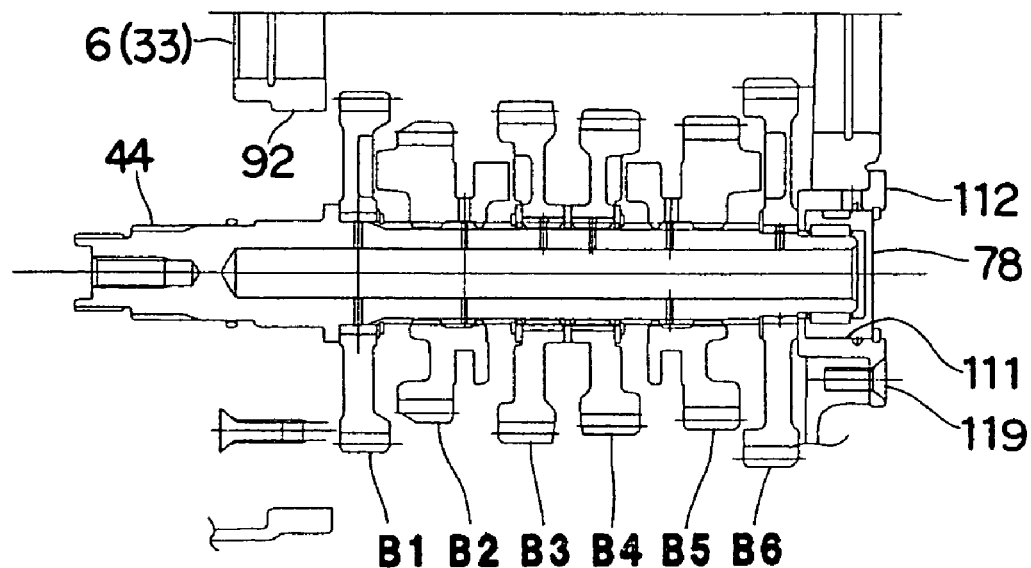
FIG. 13 is an explanatory view showing the procedure of mounting the transmission output shaft in the engine case.
Figure 14:
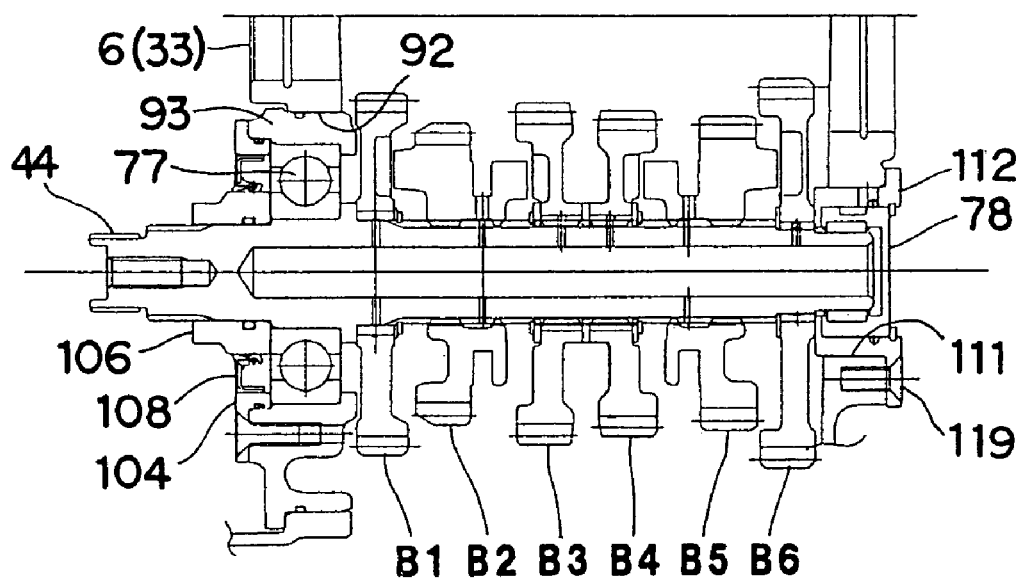
FIG. 14 is an explanatory view showing the procedure of mounting the transmission output shaft in the engine case.

Subsequently, the transmission output shaft 44 is shifted in the radial direction (in a direction orthogonal to the axial direction) (FIG. 12), and the transmission driven gears B1 to B6 thereof are meshed with the transmission driving gears A1 to A6 of the transmission input shaft 42, as shown in FIG. 5. Then, the bearing holder 112 having the roller bearing 78 is fitted in the bearing opening 111 and is fastened by the screws 119 (FIG. 13). The eccentric bearing holder 93 having the ball bearing 77, the bearing retainer 104, and the oil seal 108 is then fitted in the transmission-output-shaft insertion opening 92, and is fastened by the bolts 103 shown in FIG. 3 (FIG. 14). Finally, the spacer 106, the driving sprocket 46, and the lock nut 107 are mounted.

As described above, the axis C1 of the transmission output shaft 44 in the eccentric bearing holder 93 (the center of the bearing fitting portion 98) deviates from the center C2 of the eccentric bearing holder 93 itself (the center of the outer fitting portion 94) toward the axis C3 of the transmission input shaft 42. Therefore, the transmission output shaft 44 can be smoothly inserted from the transmission-output-shaft insertion opening 92 into the engine case 6 while preventing the transmission driven gears B1 to B6 mounted on the transmission output shaft 44 from interfering with the transmission driving gears A1 to A6 mounted on the transmission input shaft 42. This can enhance the mountability of the transmission output shaft 44 and the transmission driven gears B1 to B6.

In addition, the ball bearing 77 supporting the left end of the transmission output shaft 44 can be attached to and detached from the engine case 6 (i.e., lower case section 33) along with the eccentric bearing holder 93 and can be placed extremely close to the roller bearing 75 supporting the left end of the transmission input shaft 42. It is therefore possible to reduce the central distance between the transmission input shaft 42 and the transmission output shaft 44 and to thereby make the engine case 6 compact.

In the engine 3, the crankshaft 41, the transmission input shaft 42, and the secondary balancer shaft 43 are rotatably supported at the mating surface 34 between the upper case section 32 and the lower case section 33 that constitute the engine case 6, and the transmission output shaft 44 is rotatably supported in the lower case section 33. Therefore, the transmission output shaft 44 can be placed below the other rotation shafts 41, 42, and 43. This can reduce the front-rear length of the engine case 6 and the total size of the engine 3.

Further, since only one mating surface 34 is provided in the engine case 6, the improved workability of the engine case 6 and mountability of the rotation shafts can be achieved.

Furthermore, the mating surface 34 inclines forward downward in the side view of the motorcycle, and the secondary balancer shaft 43, the crankshaft 41, and the transmission input shaft 42 are arranged in that order from the front side in the motorcycle running direction. Consequently, it is possible to reduce the space occupied by the rotation shafts 41, 42, and 43 in the front-rear direction, to effectively utilize the front and rear spaces of the crankshaft 41, and to mainly reduce the front-rear (longitudinal) size of the engine case 6.

Moreover, the transmission output shaft 44 is disposed below the transmission input shaft 42 at a portion near the crankshaft 41. This can increase the space occupation efficiency in the engine case 6. In this respect, the front-rear size of the engine case 6 can also be reduced.

Although the engine 3 of the motorcycle of this embodiment is of a parallel four-cylinder type, the present invention can be widely applied to any engine without being limited by the number or arrangement of the cylinders as long as the engine has a splittable engine case composed of an upper case section and a lower case section and rotation shafts rotatably supported in the engine case extend in the motorcycle width direction.

It is to be noted that the present invention is not limited to the described embodiment and many other changes and modifications may be made without departing from the scopes of the appended claims.

What is claimed is:

1. An engine for a motorcycle, comprising:
   an engine case split into an upper case section and a lower case section, which are mated at a mating surface extending linearly therebetween;
   a crankshaft, a transmission input shaft and a balancer shaft which extend in a width direction of the motorcycle and are supported at the mating surface between the upper case section and the lower case section; and
   a transmission output shaft supported in the lower case section to be rotatable by the transmission input shaft and be disposed below the transmission input shaft,
   wherein the mating surface inclines obliquely forward in a side view of the motorcycle, and the balancer shaft, the crankshaft, and the transmission input shaft are arranged in such described order from a front side in a running direction of the motorcycle, and
   the lower case section has one side wall portion to which a circular transmission-output-shaft insertion opening is formed through which the transmission output shaft is inserted into the engine case, the one side wall portion being a side wall of the lower case section positioned on an opposite side of a clutch unit, the transmission-output-shaft insertion opening has an inner diameter set to be larger than an outer diameter of a largest one of transmission driven gears mounted on the transmission output shaft, an eccentric bearing holder is mounted in the transmission-output-shaft insertion opening in a detachable manner from outside of the engine case, the eccentric bearing holder holding a bearing which rotatably supports one end of the transmission output shaft, and an axis of the transmission output shaft deviates from a center of the eccentric bearing holder toward the transmission input shaft.

2. The motorcycle engine according to claim 1, wherein the transmission output shaft is disposed behind the crankshaft.

3. The motorcycle engine according to claim 1, wherein the transmission output shaft is disposed between the transmission input shaft and a water pump in the side view of the motorcycle, and the transmission input shaft, the transmission output shaft and the water pump are arranged in the described order from an upper side in a vertical direction.

* * * * *